(No Model.)  3 Sheets—Sheet 1.

A. WEEKS.
FLOATING TORPEDO.

No. 274,069. Patented Mar. 13, 1883.

Attest:
James O. Marceron
W. F. Johnson

Inventor:
Asa Weeks
by F. B. Brock, Atty.

(No Model.)  A. WEEKS.  3 Sheets—Sheet 2.
FLOATING TORPEDO.
No. 274,069.  Patented Mar. 13, 1883.
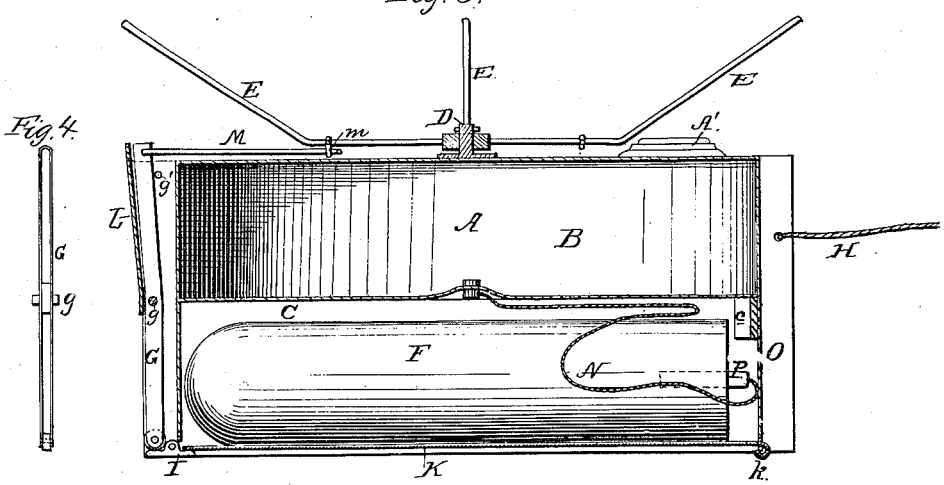
Attest:
James O. Marceron
W. T. Johnson.
Inventor:
Asa Weeks
by C. W. B. Brock,
Atty.

(No Model.) 3 Sheets—Sheet 3.
A. WEEKS.
FLOATING TORPEDO.
No. 274,069. Patented Mar. 13, 1883.
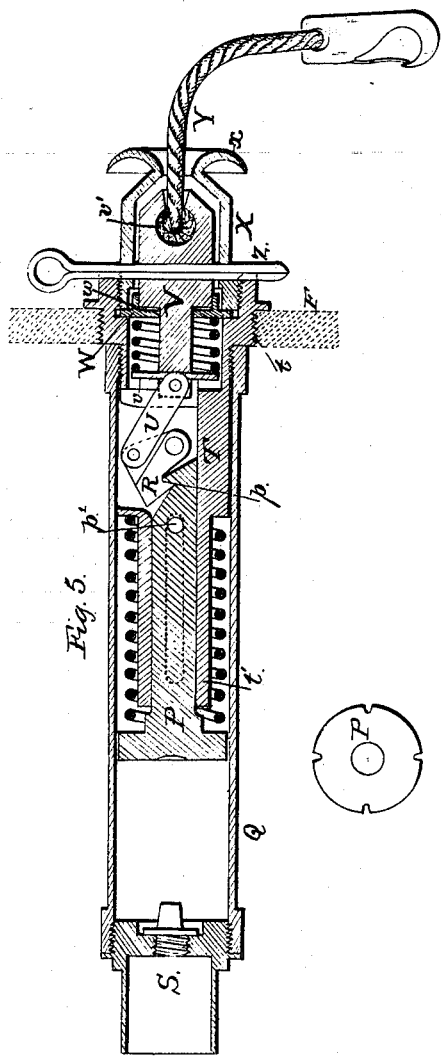
Attest:
James O. Marceron
W. F. Johnson
Inventor:
Asa Weeks
by C. B. Brock
Atty.

UNITED STATES PATENT OFFICE.

ASA WEEKS, OF MINNEAPOLIS, MINNESOTA.

FLOATING TORPEDO.

SPECIFICATION forming part of Letters Patent No. 274,069, dated March 13, 1883.

Application filed May 10, 1882. (No model.)

*To all whom it may concern:*

Be it known that I, ASA WEEKS, a citizen of the United States, residing at Minneapolis, in the county of Hennepin and State of Minnesota, have invented certain new and useful Improvements in Torpedoes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
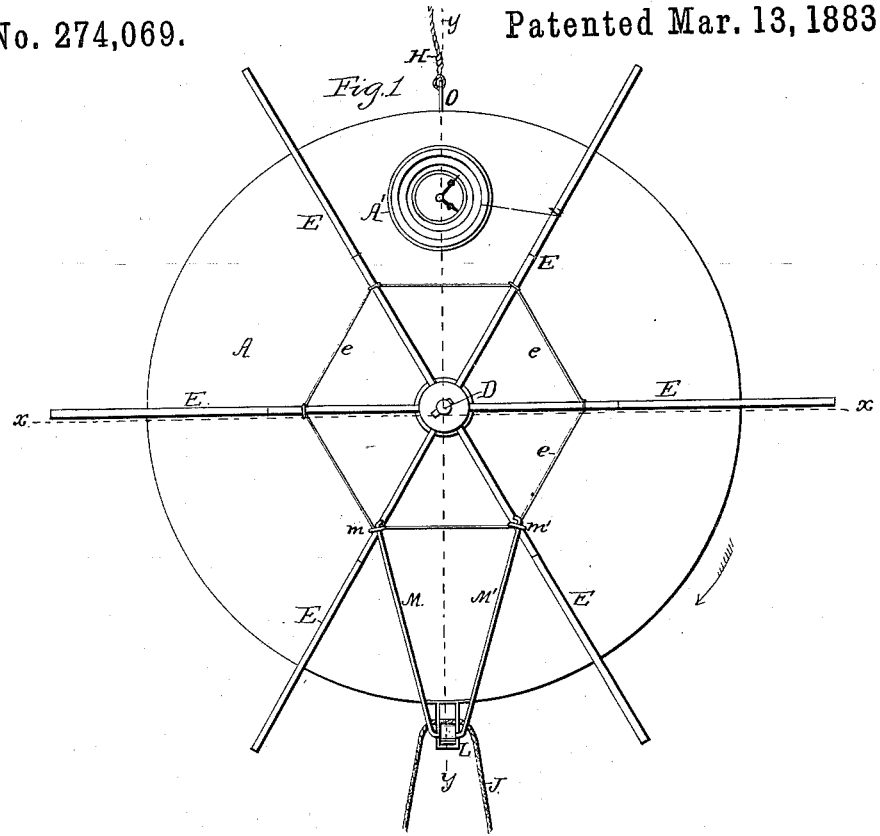
Figure 2:
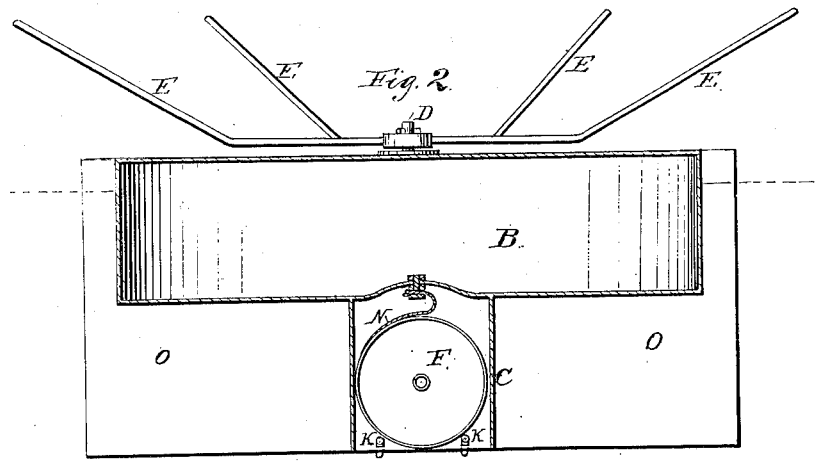

Figure 1 represents a top plan view of a device embodying my invention. Fig. 2 represents a central vertical section through the line $x$ $x$ of Fig. 1. Fig. 3 is a similar view through the line $y$ $y$ of Fig. 1. Fig. 4 is a detail view of the trip-lever. Fig. 5 represents an enlarged central longitudinal section through the firing-pin mechanism of the torpedo. Fig. 6 is an end view of the firing-pin proper. Fig. 7 represents a diagram view of a series of torpedoes and floats connected by lines or ropes.

My invention relates to torpedoes used in warfare; and it consists of the following construction and arrangement of the parts, which will be first fully described, and then set forth in the claims.

In the accompanying drawings, A represents the float for carrying the torpedo. It is composed of a water-tight air-chamber, B, preferably constructed of two circular sheet metal heads united by a short cylindrical section of the same material. Secured to the bottom of the chamber A is a casing, C, closed at the sides and ends, but open at the bottom, and extending across the float in a line corresponding with the diameter thereof. This casing is of sufficient width to receive the torpedo, and in which it is held, until released by the contact of the float with any obstacle, by mechanism hereinafter to be described. Mounted upon the top of the float and arranged centrally thereon is a spindle or stud, D. Journaled upon this spindle is a hub carrying a series of radial arms, E, which are arranged to project beyond the circumference of the float, so as to be struck by any object with which the float and torpedo may come in contact. The outer ends of these arms are bent upwardly at an angle of about thirty degrees, so as to prevent them from being accidentally and prematurely operated by the action of the waves. This arrangement of the arms is rendered necessary from the fact that the float is designed to set very low in the water; but the spindle D may be elongated to a point parallel with the outer ends of the arms, so that the arms may be in a horizontal line, but I prefer the former construction. A series of brace-rods, $e$, serves to give increased rigidity to the arms E and to keep them in their proper relative places.

The mechanism for holding the torpedo F within its casing C consists of a rod or support, K, which is bent upon itself, and its ends $k$ hinged in the lower part of one end of the casing C, and upon and between which the torpedo rests. The other or bent end of the support K is normally held in a horizontal position by a centrally-pivoted step or lever, I, the other end of which lever is ordinarly in contact with the lower end of the main trip-lever G. This lever is arranged vertically upon the outer periphery of the float, extending from the top to the bottom thereof, and is incased by a jacket, L, in the sides of which it is centrally pivoted. The lower end of the lever is provided with an anti-friction roller where it engages with the lever I, but if found to work too easily with this roller it may be dispensed with. I prefer to make the lever G of two longitudinal plates, leaving a free space between them, so that the water may have free access in and out. The upper part of jacket L has all its sides inclosed, so as to protect the lever G from being prematurely operated by the force of the waves. The end of the jacket, however, from about the pivotal point of the trip-lever to the bottom thereof, is left open, so that the water may enter therein between the side plates of the said lever. Secured to the top of the lever G are two actuating-rods, M M′, the other ends of which pass respectively through eyes $m$ $m'$, located upon two of the radial arms E. The inner ends of these rods are hooked or otherwise provided with a projection which limits their outward play; but they may have an unlimited inwardly-sliding motion through the eyes. In the normal position of the lever G and rods M M′ the lever is at the outer end of its jacket or casing L and the rods at the outer limits of their motion through the eyes $m$ $m'$. If now the arms E of the float were to strike an obstacle which would cause them to rotate in the direction of the arrow, Fig. 1, the arm to which is secured the eye $m$ and rod M would pull the lever G inwardly, and thereby release its lower end from contact with the lever I, the rod M' being forced inwardly through the eye $m'$. In like manner, should the float, through contact with the vessel, cause the arms E to rotate opposite to the direction indicated by the arrow, the rod M', reaching the end of its outward play, would pull upon the lever G in the same way and with the same result, the rod M sliding inwardly through the eye $m$. Either one of these operations, which causes the lever G to disengage itself from the lever I, allows the end of said lever I which engages and holds up the support K to drop, thereby releasing the support and allowing it to fall downwardly upon its hinge $k$, whereby the torpedo is allowed to fall downwardly till it reaches the end of its rope N. One end of this rope is centrally attached to the bottom of the air-chamber of the float and the other to the firing-pin P of the torpedo, so that when the rope becomes taut the firing-pin is operated and the torpedo exploded.

O represent wings, of sheet metal, diametrically arranged on the sides and bottom of the float to keep it from turning around in the water and provide a resistance against which the arms E are operated.

The firing-pin mechanism is shown full size by Fig. 5 of the drawings.

P represents the firing-pin, and is provided at one end with a head fitting loosely the inner diameter of the casing Q. This head has a series of peripheral channels cut therein, through which the air may escape in the casing Q (between said head and the nipple which receives the percussion-cap) when the firing-pin is released from its trigger. The other end of the firing-pin has a catch, $p$, over which the pawl or trigger R falls when the firing-pin is forced back and cocked.

S represents the chamber into which the nipple is screwed, which carries an ordinary cap containing fulminate. The chamber S is itself screwed into the inner end of the casing Q, and its open end is in direct communication with the dynamite or other explosive compound in the torpedo-shell. In this chamber S additional fulminate may be placed when desired.

T represents an inner shell screwed into the outer end of the casing Q, and by means of the exterior thread, $t$, screwed into the torpedo-shell F, as shown in dotted lines, Fig. 5. The inner extension of this shell T forms a sleeve, $t'$, through which the firing-pin works. It is prevented from turning around in the sleeve by a stud, $p'$, operating in a slot of suitable length in the sleeve. Surrounding this sleeve is a coiled spring resting between the head of the firing-pin and the shouldered end of the sleeve, so that when the firing-pin is cocked the spring is under considerable compression. The trigger R is pivoted in the shell T. A link, U, connects the trigger with the spring-bolt V. The inner end of this bolt carries a circular plate or washer, $v$, between which and a ferrule, W, secured in place between the shell T and casing X, rests a coiled spring having a constant tendency to shove the bolt V inwardly. The outer end, or end to which the operating-rope Y is attached, is made of larger diameter than the inner end, so as to provide a shoulder which shall fit into the annular flange $w$ of the ferrule W. The casing X is rimmed out on the sides and front of the said annular flange in order to form a circular space for the reception of tallow or other grease or packing, whereby the water which may enter the casing when the torpedo is submerged is prevented from getting into the firing mechanism. The casing X is made with converging walls near its outer end, and is provided with a flaring mouth-piece, $x$, of the shape shown. The bolt V has a socket, $v'$, in its outer end for attaching a short section of rope, Y, the other end of which rope is provided with a snap-hook for securing the torpedo to the float A by any desired length of rope N. A safety-pin, Z, passing through the bolt V and the casing, secures the device against any accidental discharge when not desired for use.

$g'$ represents an eye pierced in the casing L, Fig. 3, through which passes a line, J, Fig. 1. When the float is let down from shipboard or other point the line J is passed through the eye, which serves to keep the lever G in the outer end of its casing against premature displacement. Both ends of the line are kept on shipboard. When, however, the torpedo has floated off any desired distance, one end of the line is released and the other pulled in, thereby drawing the line out of the eye, leaving the torpedo ready for action.

This invention is designed for use on all vessels, but more particularly on war vessels of inferior equipment. A vessel provided with my improved floats, if chased by a ship of superior armament, lets out these floating torpedoes, which, if run upon by the pursuing vessel, causes them to explode. For the purpose of their effecting their design more surely, the floats are made to set very low in the water, and are painted a color corresponding to the color of the sea-water. For the same purpose, also, I prefer to connect them by buoyed lines H. This is illustrated in diagram, Fig. 7. The pursued vessel tacks or sheers off in a zigzag or other line, letting out a series of torpedoes connected by these lines H, and covering considerable area. Should the pursuing vessel steer clear of the torpedoes she will run upon their buoyed lines, which will have the effect of pulling the adjacent floats to the sides of the vessel and bring the arms E in contact therewith.

The line N is made of sufficient length to allow the torpedo to drop down below the armor of the vessel before its firing mechanism is actuated, the mouth-piece of which being of such rounded flaring shape as to provide for the operation of the firing-pin by the line, no matter what end or side of the torpedo is projected first.

A time mechanism, A', is provided for firing the torpedo after a stated interval of time has elapsed—say six hours—should it fail to effect its work. It has a connection with one of the arms E, through which it operates. I prefer to set it diametrically opposite the lever G and its casing, so as to act as a counter-weight to the same. Other means may be used to balance the float, however, as a filling of metal, (shown at c, Fig. 3.)

Another way in which I design to use my present invention is to dispatch one or two or more floats connected by buoyed lines from shore or shipboard, so that the current or tide will float them down upon the enemy with the same results as has been heretofore described.

What I claim is—

1. A torpedo-float having a central hub carrying a series of radial vibratory contact-arms, having their outer ends bent upwardly, as described, and adapted to operate in combination with a releasing mechanism of a torpedo.

2. A cylindrical torpedo-float having a firing mechanism, as described, a series of contact-arms, and wings or vanes for providing a resistance in the water, against which the arms operate.

3. A float having a central hub carrying projecting vibratory contact-arms and releasing mechanism, substantially as described, whereby the said releasing mechanism will be actuated by the vibration of said arms in either direction.

4. A torpedo-float having wings to prevent rotation, a torpedo carried thereby, arms attached to a central hub, and connecting mechanism, substantially as described, for releasing the torpedo, and a line attached to the float and to the torpedo to actuate the firing-pin of the latter, all acting in combination, as set forth.

5. A torpedo-float having an air-chamber and a bottomless chamber extending across the under side of the float, in combination with a hinged support for the torpedo, covering normally the bottom of the latter chamber, and means, substantially as described, for holding and releasing the said support.

6. A torpedo-float, a hinged support for the torpedo carried thereby, the free end of which has a bearing on one end of a tilting lever, a trip-lever which normally engages the other end of said tilting lever, and mechanism, substantially as described, for operating the trip-lever upon contact of the float, whereby the hinged support is disengaged and the torpedo precipitated, all constructed to act in combination, substantially as set forth.

7. A torpedo-float having radial vibratory arms secured to a central hub, a trip-lever for releasing the torpedo, and rods connecting the said arms and trip-lever, by means of which the latter is actuated by the vibration of the radial arms in either direction, substantially as set forth.

8. The combination, with floats A, of arms E, having eyes m m', the trip-lever G, and the arms or rods M M', pivoted to the latter and passing through the eyes, the whole arranged for operation substantially as described.

9. In combination with a firing mechanism, substantially as described, having a spring-bolt adapted to be pulled outwardly to actuate the firing-pin, a safety-pin passing through said spring-bolt and its casing to secure the bolt against premature action.

10. The firing mechanism, as described, comprising an outer casing carrying an anvil or nipple, and an inner shell carrying the operating parts, consisting of a spring-impelled firing-pin, a pivoted trigger engaging a catch on the firing-pin, a spring-bolt adapted to operate the firing-pin by an outward pull, and a pivoted link connecting the trigger and the spring-bolt, all constructed to act in combination, substantially as set forth.

In testimony whereof I affix my signature in presence of two witnesses.

ASA WEEKS.

Witnesses:
F. B. BROCK,
W. T. JOHNSON.